UNITED STATES PATENT OFFICE.

JOHN R. WATSON, OF CARTAGO, AND WILHELM HIRSCHKIND, OF PITTSBURG, CALIFORNIA, ASSIGNORS TO CALIFORNIA ALKALI COMPANY, OF SAN FRANCISCO, CALIFORNIA, A CORPORATION OF CALIFORNIA.

PROCESS OF MAKING SODIUM SESQUICARBONATE AND OF RECOVERING SODIUM CARBONATES FROM NATURAL WATERS.

1,319,128.      Specification of Letters Patent.      Patented Oct. 21, 1919.

No Drawing.      Application filed October 29, 1917. Serial No. 199,007.

*To all whom it may concern:*

Be it known that we, JOHN R. WATSON, a citizen of the United States, and a resident of Cartago, Inyo county, California, and WILHELM HIRSCHKIND, a subject of the King of Bavaria, and a resident of Pittsburg, Contra Costa county, California, have invented certain new and useful Improvements in Processes of Making Sodium Sesquicarbonate and of Recovering Sodium Carbonates from Natural Waters, of which the following is a specification.

Our invention relates to the process of making sodium sesqui-carbonate and of recovering sodium carbonates from natural waters.

The object of the invention is to provide an economical and simple method of making sodium sesqui-carbonate and to utilize this method in treating natural waters containing sodium carbonate for the recovery of sodium carbonates therefrom by the production of sesqui-carbonate.

Our improved process of making sodium sesqui-carbonate consists in adding to a solution of sodium carbonate which may already contain a certain amount of sodium bicarbonate such a further amount of sodium bicarbonate suspended in water as will suffice to convert a large part of the sodium carbonate contained in the solution being operated upon into sesqui-carbonate, the addition of bicarbonate being made progressively with agitation of the solution so that there will at all times until the end of the operation be an excess of sodium carbonate present.

This improved process is particularly applicable as a part of our process for the extraction of sodium sesqui-carbonate from natural waters containing alkaline salts. These waters naturally contain in addition to the sodium carbonate and bicarbonate such other salts as sodium sulfate, potassium chlorid, borax, etc., and by this improved process a pure form of sodium sesqui-carbonate may be obtained from the crude concentrated natural waters in a solid state and by simple means.

In carrying out one form of our process, we treat a portion of the water from which the sodium carbonates are to be extracted with carbonic acid gas so as to convert the sodium carbonate which it naturally contains into bicarbonate, a less soluble compound, and so obtain the bicarbonate as a solid powder which may be removed from this portion of the natural water by filtration. We then suspend this powder of sodium bicarbonate in such a quantity of either fresh water or natural water as will suffice to make a cream of it so that it may be conveniently handled by pumps, etc., and then add this cream slowly to a relatively large mass of the concentrated natural water, agitating the latter meanwhile so as to prevent the solid bicarbonate from settling to the bottom. In this way the sodium bicarbonate reacts with the sodium carbonate in solution to form the sesqui-carbonate which is desired, and which on account of its relative insolubility, separates from the mass of solution and with a certain quantity of bicarbonate there is effected a separation of a larger quantity of sesqui-carbonate, which separates in the solid state so that it may be readily removed from the solution in which it was formed by the ordinary operations of filtration.

In order that the desired action of the solid bicarbonate powder upon the sodium carbonate in solution may take place, the solution is maintained at a temperature above 45° C., and after the whole of the necessary bicarbonate has been added, the solution may advantageously be allowed to cool to atmospheric temperature as by this means a further and more complete separation of the sesqui-carbonate formed is effected.

While we have described the preferred manner of practising our invention, it will be obvious to those skilled in the art, after having understood our invention, that certain modifications in the preferred method set forth may be made without departing from the spirit or scope of the invention.

Having thus described our invention, what we claim as new and desire to secure by Letters Patent, is:—

1. The process of manufacturing sodium sesqui-carbonate which consists in adding solid sodium bicarbonate to a solution containing sodium carbonate and separating the sesqui-carbonate produced.

2. The process of manufacturing sodium sesqui-carbonate which consists in adding gradually solid sodium bicarbonate to a solution of sodium carbonate so that during the formation of the sesqui-carbonate there may be until the very end of the operation an excess of sodium carbonate.

3. The process of recovering sodium carbonate from natural waters which consists in adding to the water after necessary concentration, solid sodium bicarbonate so as to cause a separation of sodium sesqui-carbonate.

4. The process of treating natural waters which consists in passing carbonic acid gas through a part of the water to be treated so as to obtain sodium bicarbonate and adding this bicarbonate in a solid state to another portion of the natural water to produce sodium sesqui-carbonate and separating the sesqui-carbonate so produced.

5. The process of recovering sodium carbonate from waters which consists in adding to the waters gradually solid sodium bicarbonate in powder suspended in water as a flowing mixture and separating the sodium sesqui-carbonate so formed.

6. The process of manufacturing sodium sesqui-carbonate which comprises adding powdered sodium bicarbonate to a solution containing sodium carbonate, and agitating the solution for the purpose of bringing the added sodium bicarbonate into intimate contact with the sodium carbonate already in solution, then separating the sesqui-carbonate so formed from the solution.

7. The process of manufacturing sodium sesqui-carbonate which consists in passing carbonic acid gas through concentrated natural water containing sodium carbonate to form sodium bicarbonate, separating said sodium bicarbonate from said natural waters, taking the sodium bicarbonate so obtained and mixing it in solid form with a fresh portion of said natural water, and agitating the same to bring the said added sodium bicarbonate into intimate contact with the sodium carbonate found in said natural water to produce sodium sesqui-carbonate, and then separating said sodium sesqui-carbonate from said water.

8. The process of manufacturing sodium sesqui-carbonate which consists in adding solid sodium bicarbonate to a solution containing sodium carbonate, maintaining the solution above atmospheric temperature to facilitate the reaction between the sodium carbonate and sodium bicarbonate, allowing the solution to cool, and separating the sesqui-carbonate produced.

9. The process of manufacturing sodium sesqui-carbonate which consists in adding solid sodium bicarbonate in powder suspended in water as a flowing mixture slowly and progressively to a solution containing sodium carbonate, agitating the mixture to prevent the solid bicarbonate from settling, maintaining the solution above atmospheric temperature to facilitate the reaction between the sodium carbonate and sodium bicarbonate, allowing the solution to cool, and separating the sesqui-carbonate produced.

In testimony whereof, we have signed our names to this specification.

JOHN R. WATSON.
WILHELM HIRSCHKIND.

Copies of this patent may be obtained for five cents each, by addressing the "Commissioner of Patents, Washington, D. C."